US006260310B1

(12) United States Patent
Price et al.

(10) Patent No.: US 6,260,310 B1
(45) Date of Patent: Jul. 17, 2001

(54) MAST MOUNTING SYSTEM AND METHOD

(75) Inventors: Tim Price, Herndon; Farhad Habibi, Ashburn, both of VA (US)

(73) Assignee: Tim Price, Inc., Sterling, VA (US)

( * ) Notice: Subject to any disclaimer, the term of this patent is extended or adjusted under 35 U.S.C. 154(b) by 0 days.

(21) Appl. No.: 09/420,781

(22) Filed: Oct. 19, 1999

Related U.S. Application Data

(60) Provisional application No. 60/138,542, filed on Jun. 10, 1999.

(51) Int. Cl.[7] ........ B60P 1/14

(52) U.S. Cl. ........ 52/110; 52/118; 224/546

(58) Field of Search ........ 52/110, 111, 116, 52/117, 118, 123.1; 248/74.1, 74.2, 74.4; 212/179, 180, 292, 295, 297; 224/310, 546, 570

(56) References Cited

U.S. PATENT DOCUMENTS

| | | | | |
|---|---|---|---|---|
| 840,489 | * | 1/1907 | Healey | 212/292 X |
| 2,611,580 | * | 9/1952 | Troche et al. | 202/292 X |
| 4,923,103 | * | 5/1990 | Sauber | 224/546 X |
| 5,168,680 | * | 12/1992 | Matlock | 52/118 |
| 5,657,913 | * | 8/1997 | Cucheran et al. | 224/546 X |
| 5,718,087 | * | 2/1998 | Featherstone et al. | 52/118 X |

* cited by examiner

*Primary Examiner*—Peter M. Cuomo
*Assistant Examiner*—Michael J Fisher
(74) *Attorney, Agent, or Firm*—William E. Mouzavires

(57) ABSTRACT

A mast mounting system for vehicles and shelters which utilizes at least two clamp bracket assemblies mounted to the vehicle or shelter such that during transit and storage the mast is positioned at an incline with its front end located just behind the front end of the vehicle or shelter. Each clamp bracket assembly includes a clamp having upper and lower members which wrap around the mast. The upper clamp member has an inside surface lined with a high friction material while the lower clamp member has an inside surface lined with a very low friction material which receives the mast and allows it to be easily slid backwards or forwards when the clamps are in open position. When the clamps are in closed position, the upper clamp member prevents relative movement of the mast and the clamp assembly. One of the clamp bracket assemblies is mounted for adjustable movement about horizontal and vertical axes. One of the brackets may be attached to a trolley which in turn is installed on a rail fixed to the vehicle to allow the bracket assembly to move towards or away from the other bracket assembly.

Raising the mast to the vertical is undertaken in two stages. During the first stage, the mast is slid forwards or backwards, as required, until its point of balance (with payload) is adjacent to the pivoting clamp. The foot of the mast may then be lowered by hand to the ground. This completes the first stage, leaving the mast tilted down at an angle of between 30° (degrees) and 50° (degrees) to the horizontal. During the second stage, a block and tackle, come along, or winch is used to provide mechanical advantage when required to raise or lower the mast. Guy ropes are utilized to laterally stabilize the mast during raising or lowering.

27 Claims, 13 Drawing Sheets

MAST MOUNTING SYSTEM AND METHOD

RELATED APPLICATION

This application is based on our U.S. Provisional Application Ser. No. 60/138,542 filed Jun. 10, 1999, the priority of which is claimed for the Subject Application.

BACKGROUND OF INVENTION

The invention relates to an integrated system to mount masts on mobile platforms. The mounting system secures the mast in an approximately horizontal attitude on the vehicle or shelter during storage or transportation. The system may be adapted for mounting on the side, or on the top, of vehicles or shelters. When installed on the military's High Mobility Multi Wheeled Vehicle (with or without shelter attached), hereinafter referred to as "HMMWV", the system is suitable for airlift by military C-130 aircraft and for external airlift by helicopters. During equipment set up, the mounting system permits the mast, with its associated payload, to be safely and expeditiously tilted to the vertical.

Masts have been widely employed for radio antennas, lights and a variety of other fixtures, such as instrumentation and telemetry packages, loud speakers, video cameras, atmospheric detection devices, and similar devices. Many applications involve mobile systems, where it is necessary to deploy the equipment from a secured, strap down condition during transit to a deployed configuration for system operation. The mobile systems used by the military and emergency services may have to be airlifted to a theater of operations. On arrival, they may have to travel cross country, and be set up at a remote site under adverse weather conditions and on sloping terrain.

Large masts with heavy payloads are increasingly in demand to provide a wide variety of services over extended ranges. Because of their length, these masts are often transported in a horizontal attitude attached to the exterior of the vehicle or shelter. It therefore becomes necessary for such masts to be raised to the vertical before they can be put into operation. Combined weight of mast and payload can easily exceed three hundred pounds, generating very large moments which can be hazardous if not managed with care.

For masts which are too long for vertical mounting, it would be highly desirable to provide a horizontal vehicle or shelter mast mounting system which permits safe and expeditious tilting to the vertical using minimum manpower. The mounting system must be easy to use on level or sloping ground and during adverse weather conditions, including strong winds. In the transport mode, the system must be capable of securing the mast under all conditions during off road and on road driving, and also when the vehicle is loaded on a flatbed for road or rail transportation. The system must minimize impact on vehicle handling, and any intrusion into the driver's field of view should be insignificant. For military applications, it would be important for the equipment to be compatible with, and to be economical in the use of, tactical transport aircraft, and to be suitable for external air transport by helicopter.

OBJECTS OF THE PRESENT INVENTION

Accordingly, it is the principal object of the present invention to provide an improved mast mounting system for vehicles and shelters.

An additional object is to provide a basic design which is sufficiently versatile that versions may be provided for centerline or side mounting on mobile platforms.

An additional object of the mast mounting system is that it shall provide secure transportation and storage of the mast under all conditions to be encountered during off road and on road driving.

A further object of the mast mounting system is that, with the mast installed, it shall be suitable for loading, unloading, and air transportation within the C-130 airplane.

A further object of the invention is that the standard minimum separation between contiguous vehicles on the C-130 airplane does not need to be increased, even when the mast is longer than the vehicle.

A further object of the invention is that, with the mast installed, the vehicle shall remain suitable for external air transport by helicopter.

A still further object of the invention is to permit safe, efficient and expeditious operation by a crew of two persons.

An additional object of the design is to permit safe operation by a one person crew.

An additional objective of the invention is to provide good access to the mast top in the early stages of equipment deployment so as to facilitate attachment of payload and guy ropes by the crew.

Yet another object of the design is to permit the crew to tilt the mast up from the transit condition to the vertical with any payload within the mast's capacity.

Another object of the invention is that it shall be safely operable with any payload within the mast's capacity in wind speeds to thirty (30) miles per hour.

A further object of the invention is that it shall be operable on ground sloping up to 10 degrees in any direction relative to the vehicle.

An additional object of the design is to provide the capability to release the mast from the shelter or vehicle once the mast is vertical, so that the vehicle may be driven away from the mast.

A still further object of the invention is that, following deployment and separation of the vehicle from the mast, it shall be possible with a two person crew to safely, efficiently and expeditiously restore the mast to the transport condition on the vehicle. In addition, it shall be an objective of the invention that it shall be possible for a one person crew to safely carry out the restoration operation.

DRAWINGS

The above and other, further and more specific objects of the present invention will be apparent to those skilled in the art from the following detailed description, taken in conjunction with the drawings in which.

Figure 1:
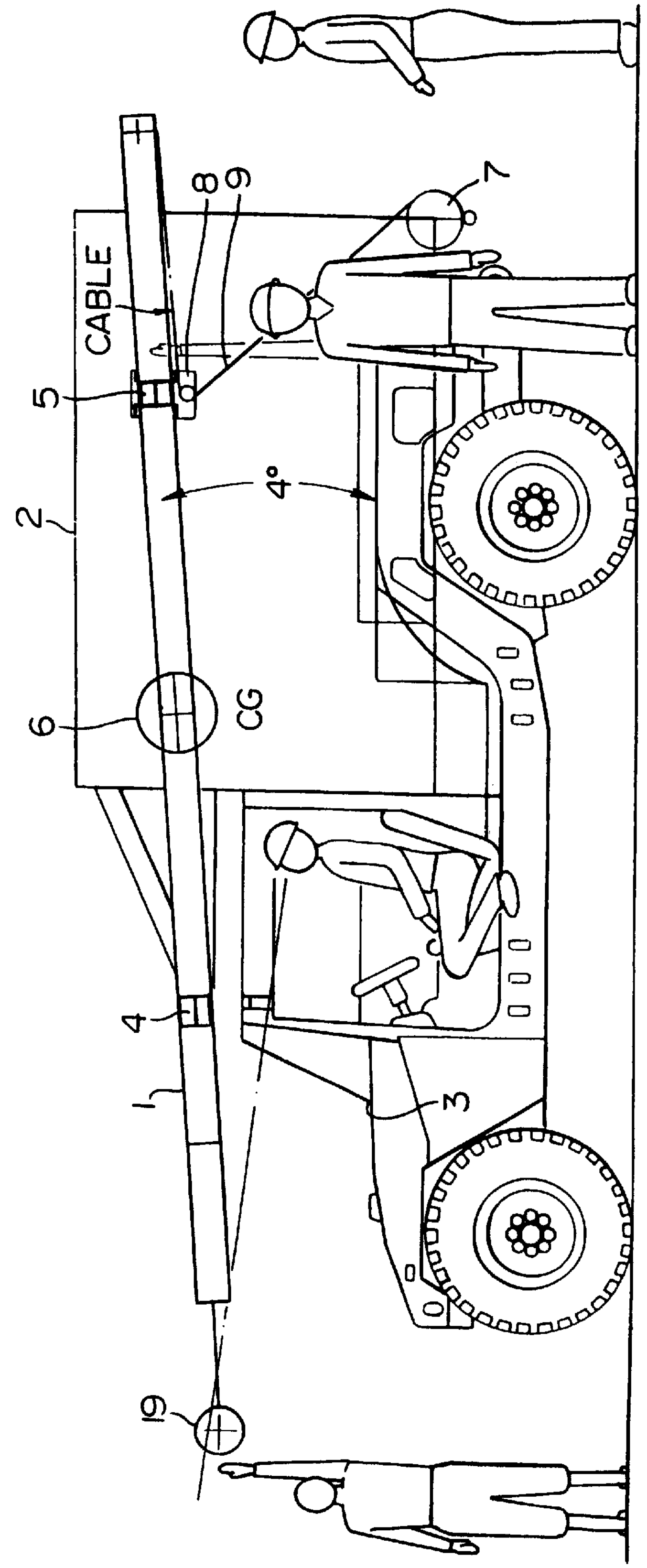
FIG. 1 is a side view of a military HMMWV with LMS shelter, on which a mast is side-mounted using the first embodiment of this invention. This view shows the system in the transport configuration.
Figure 3:
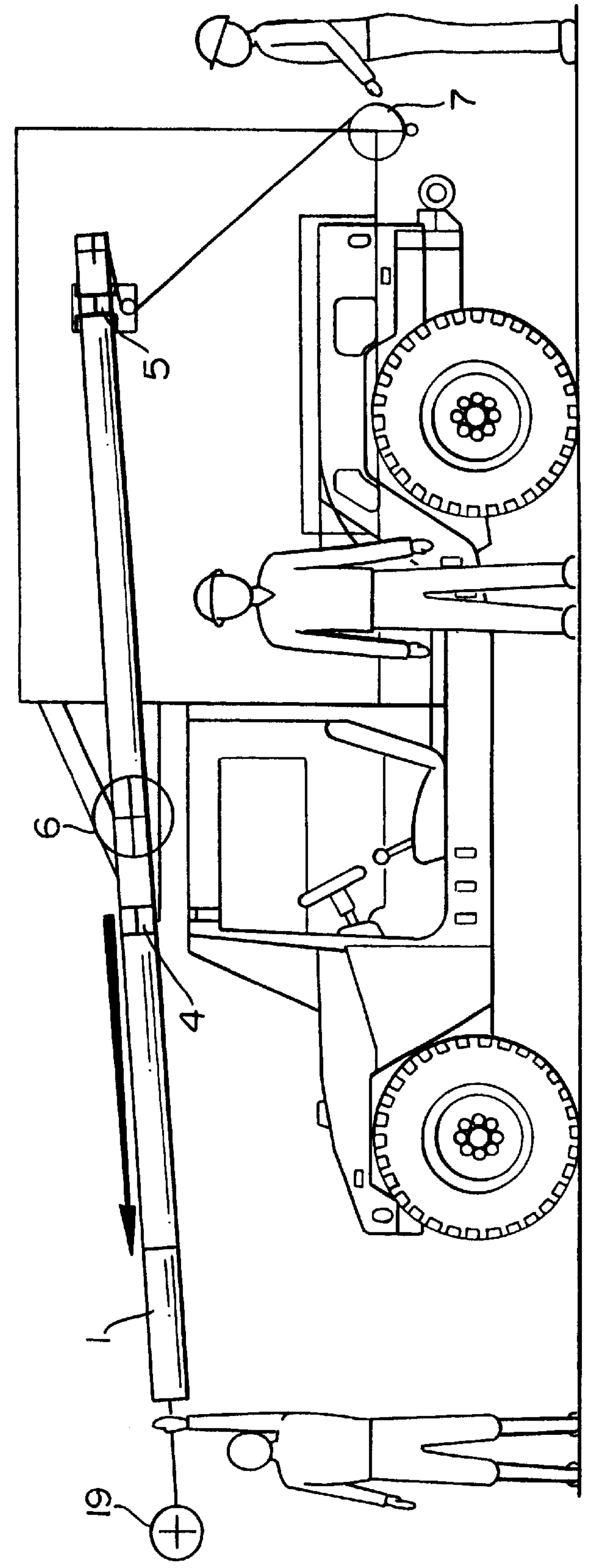

FIG. 3 the same view as FIG. 1, but now shows the system at an early stage of the operating sequence.

Figure 4:
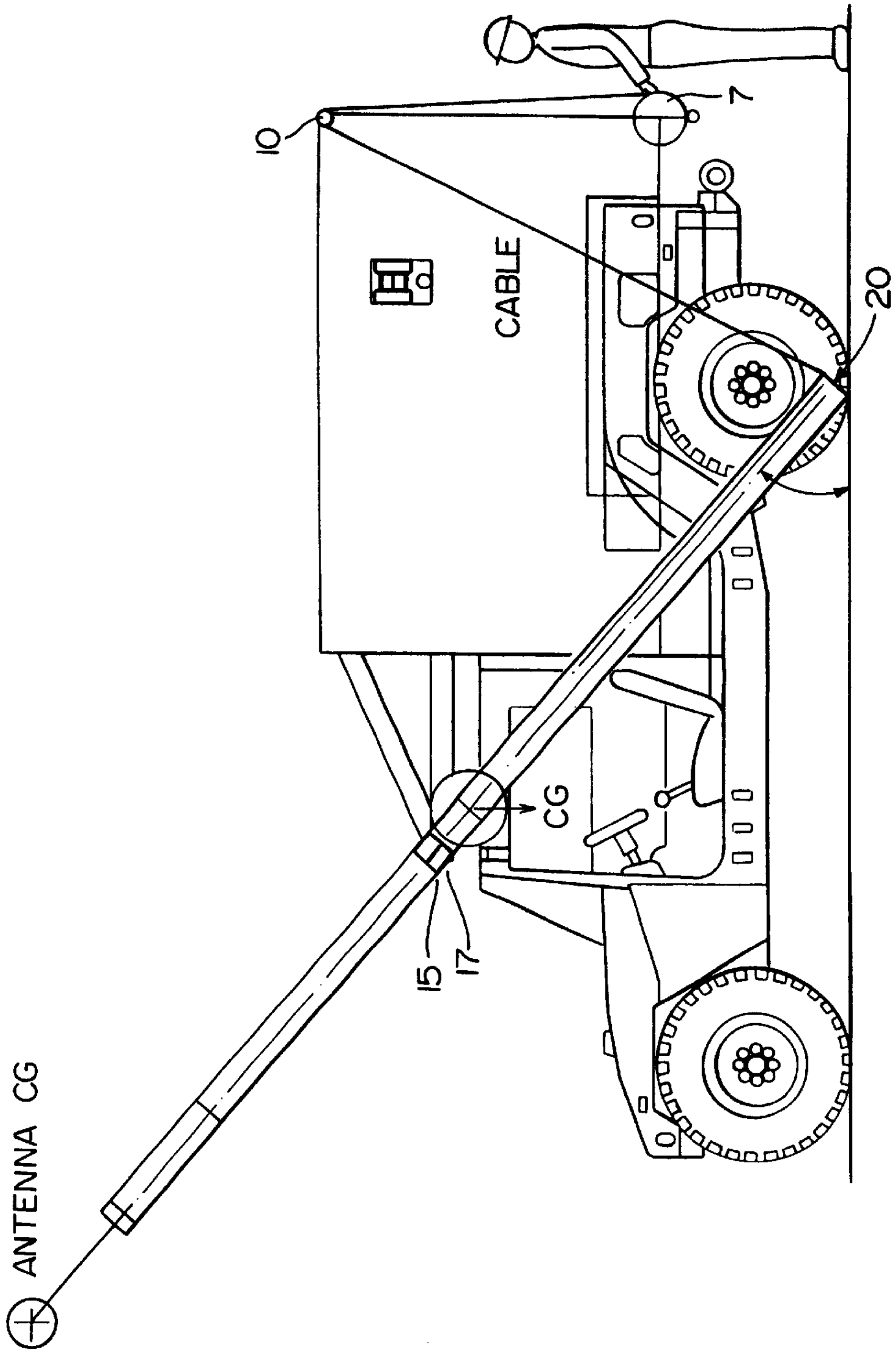
Figure 5:
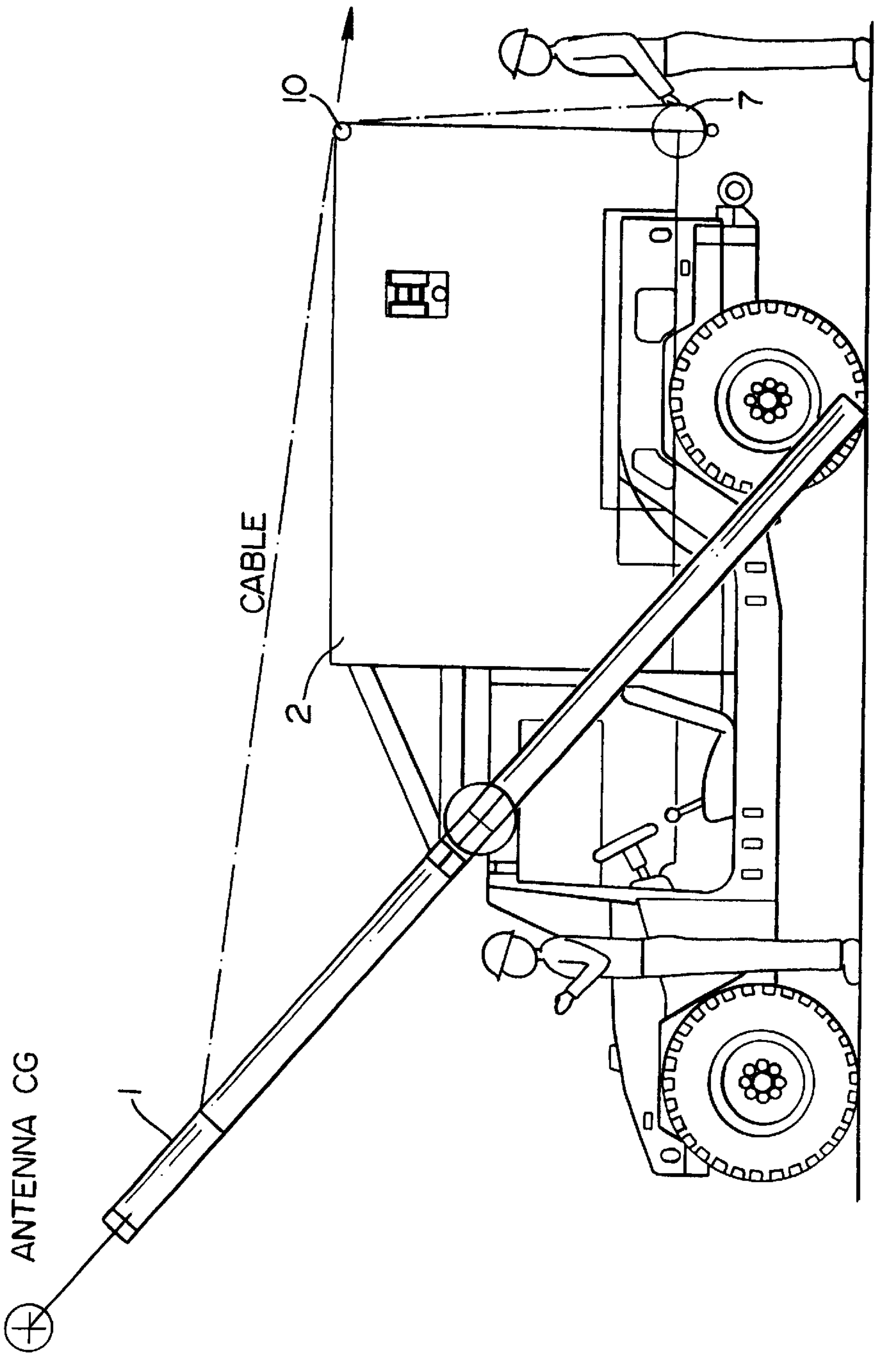

FIGS. 4 and 5 show the same view as FIG. 1, with the mast at later stages of the operating sequence of the invention.

Figure 6:
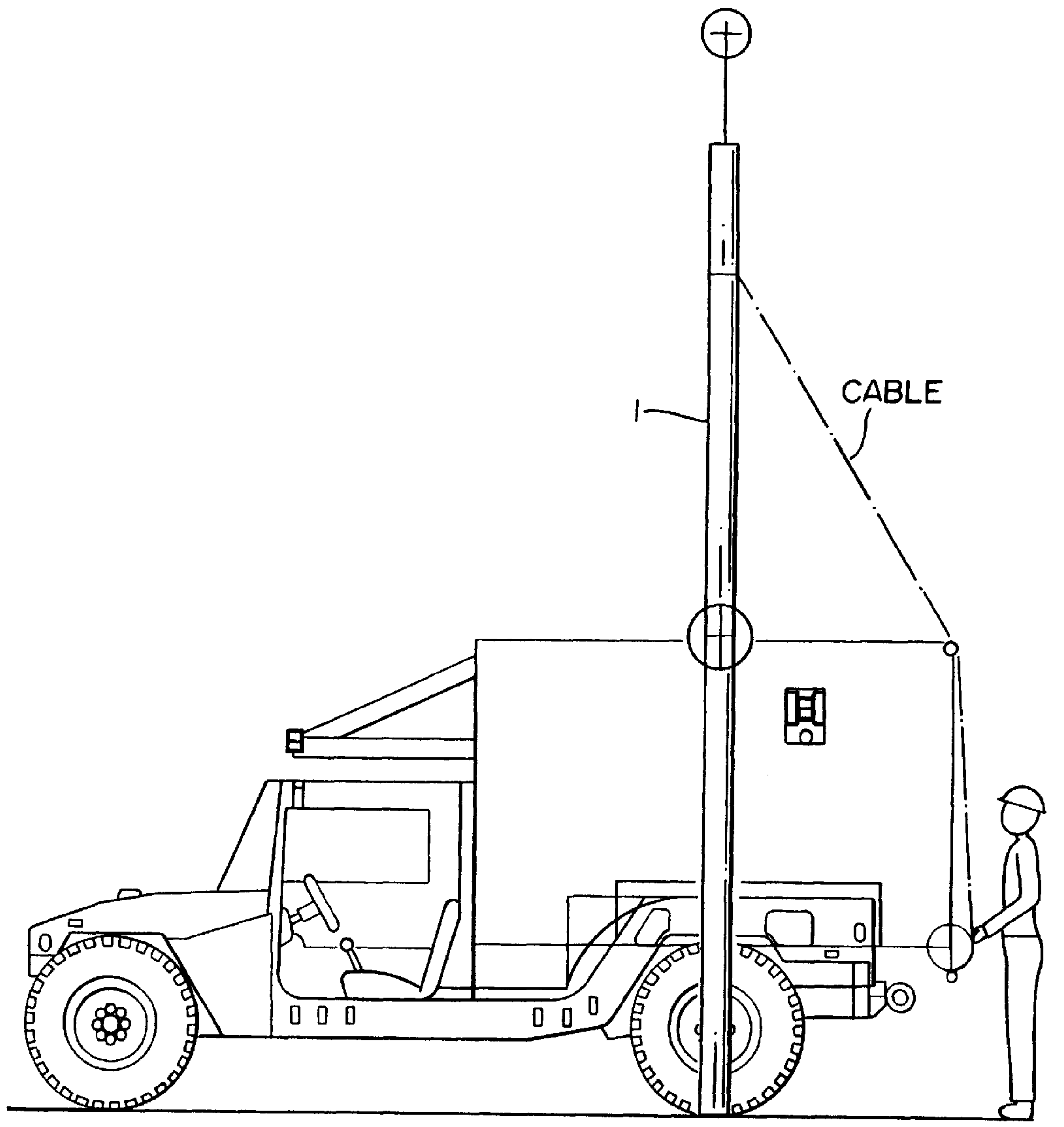

FIG. 6 shows the end of the operating sequence of the first embodiment of the invention, with the mast in the deployed configuration.

FIG. 7 shows side views of an embodiment of the invention as a centerline mount on top of a HMMWV. The side views illustrate the first stages of deployment of a system utilizing the second preferred embodiment of the invention.

FIG. 8 is the same view as FIG. 7, but now shows the system at later stages of the operating sequence.

Figure 9:
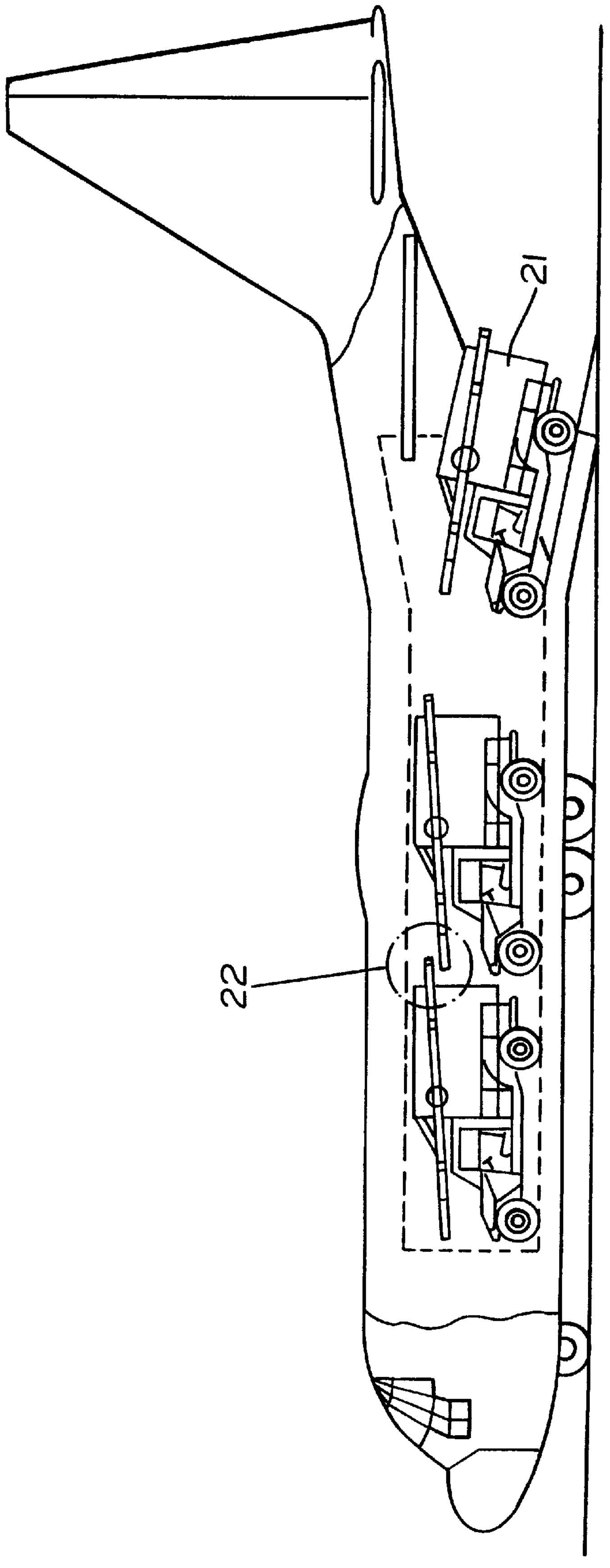

FIG. 9 shows the cargo loading profile of a military C-130 airplane, with mast mounted on three HMMWVs by means of the invention.

Figure 10:
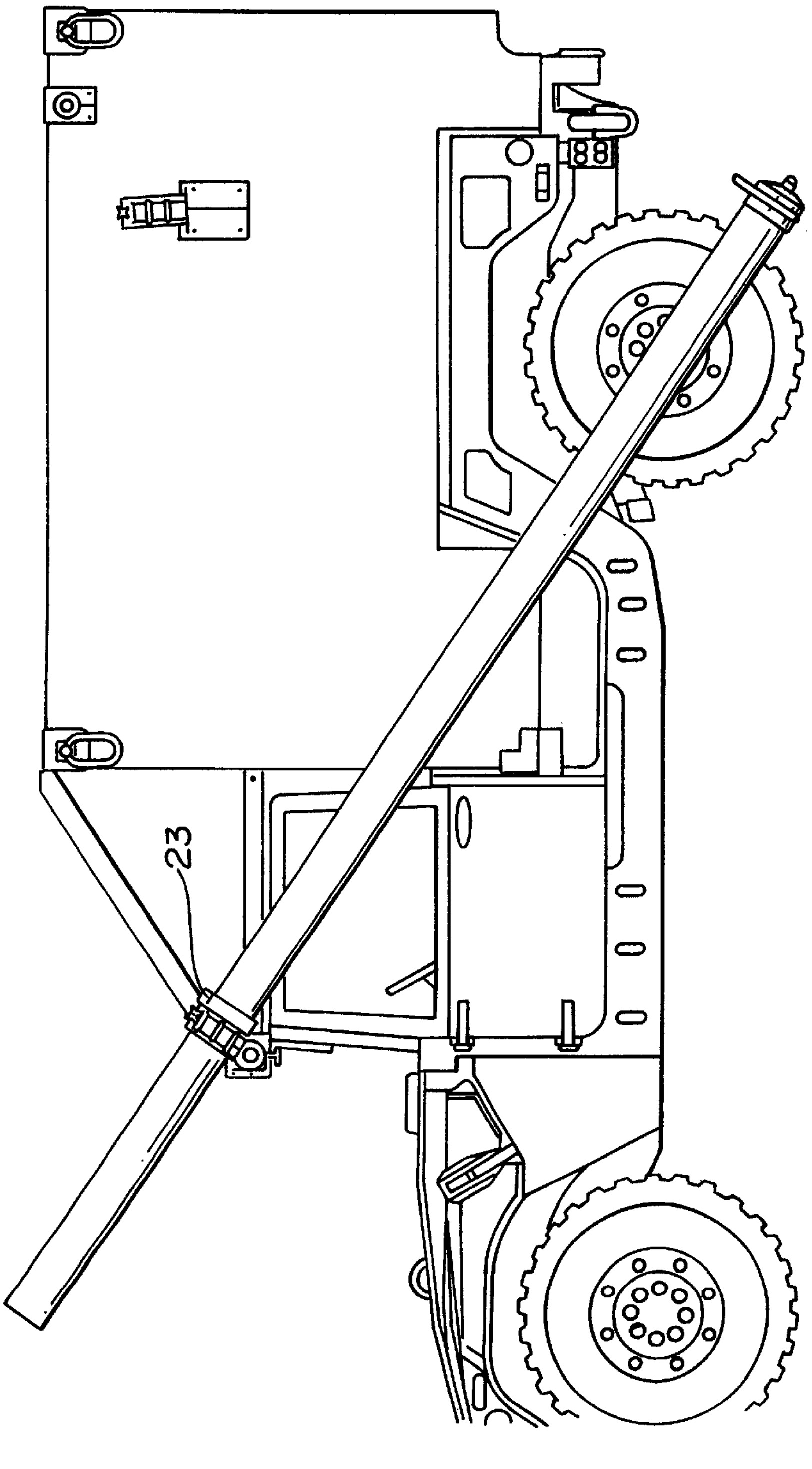

FIG. 10 shows a side view of the first embodiment, with the mast foot resting on the ground and the part of the mast body coincident with the center of gravity of the mast and payload combination resting in the pivot clamp.

Figure 11:
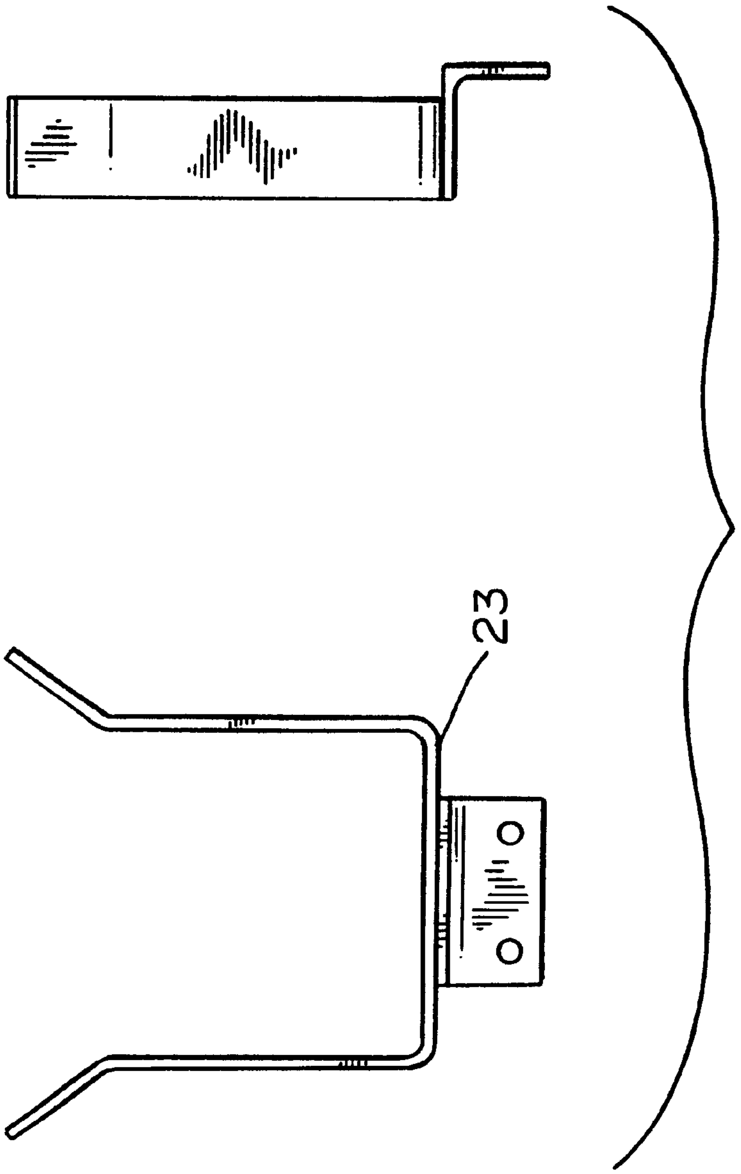

FIG. 11 shows a detail of a guide bracket included in a clamp bracket assembly of the present invention.

Figure 12:
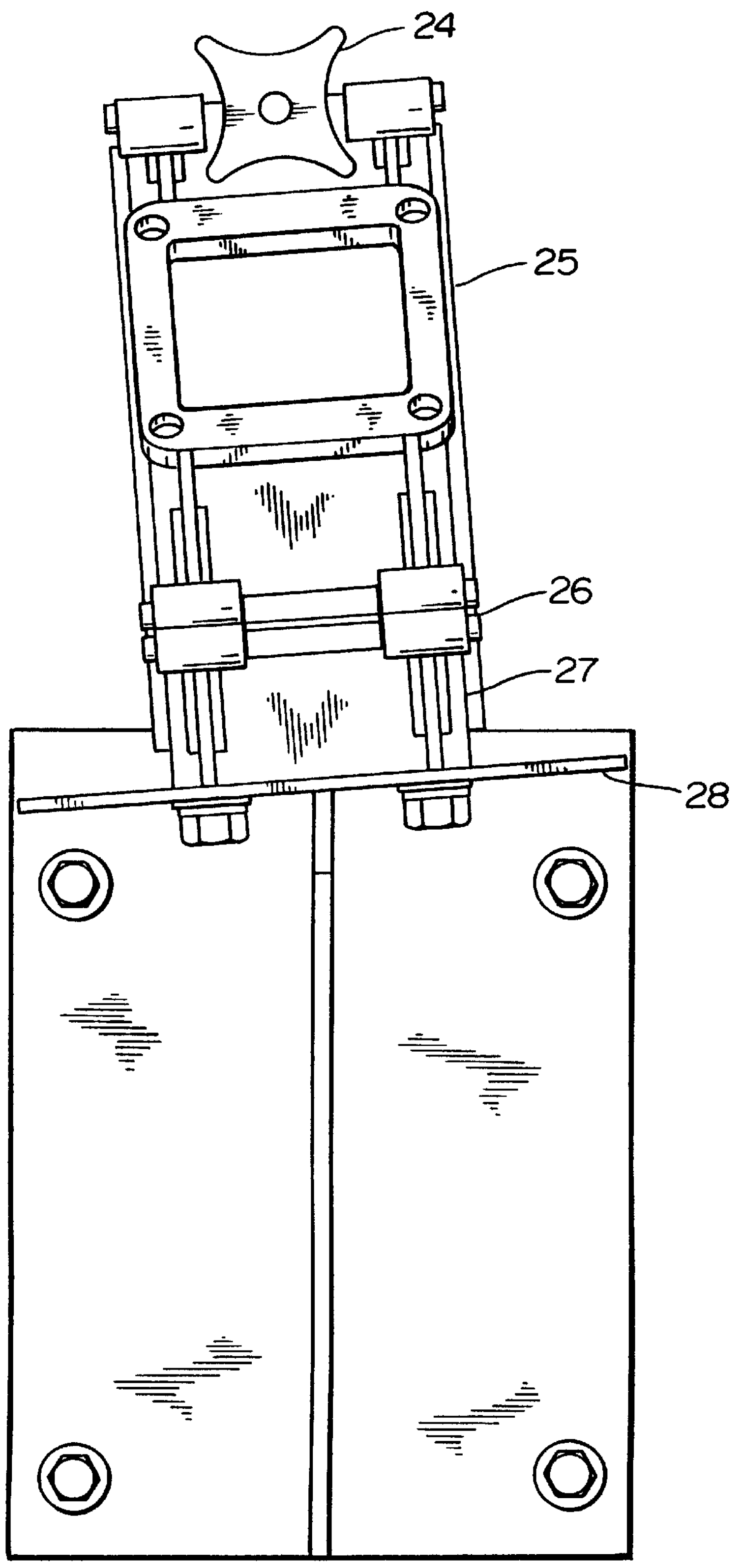

FIG. 12 is an enlarged side elevational view of a clamp bracket assembly.

Figure 13:
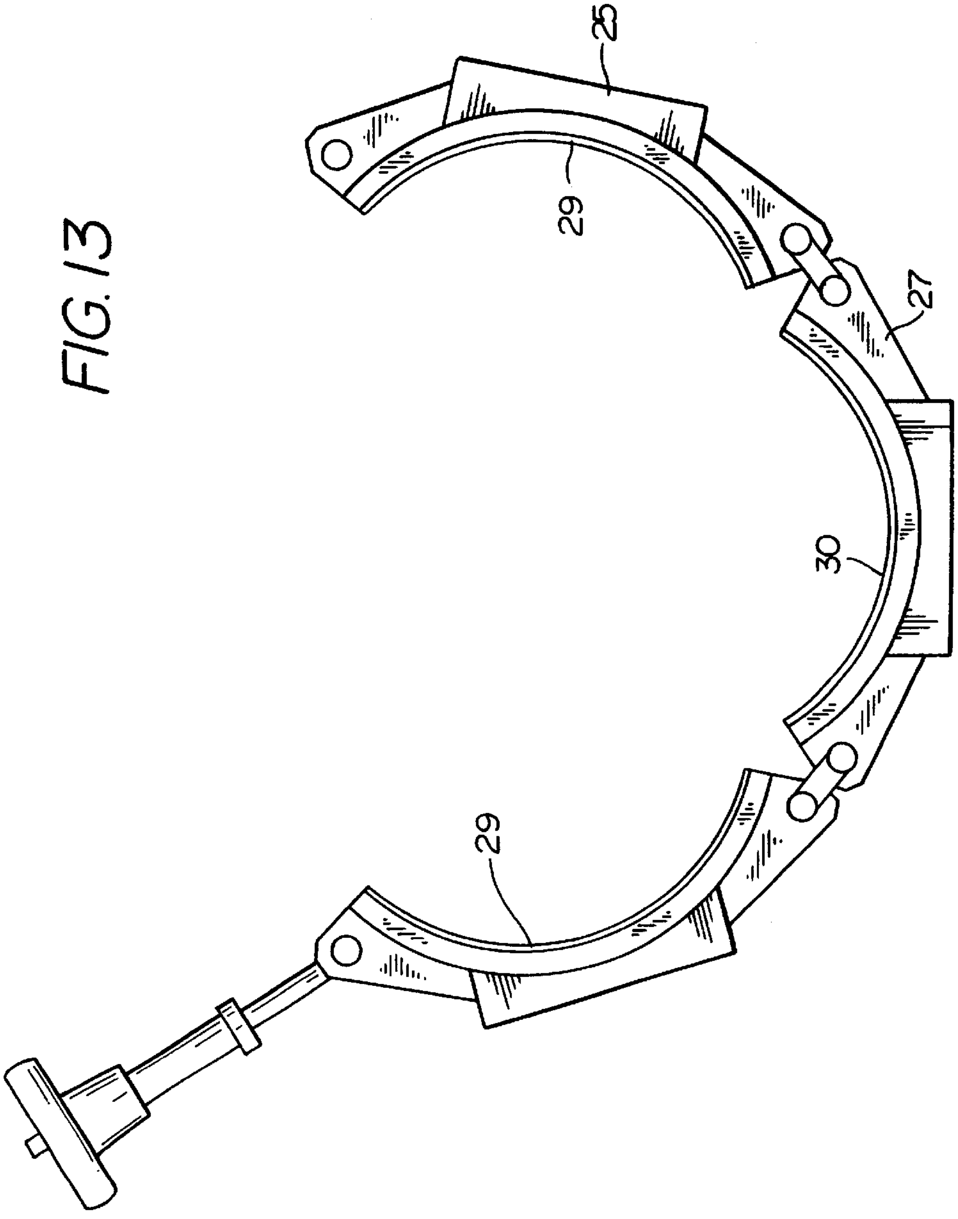

FIG. 13 is a front elevational view of a clamp included in the clamp bracket assembly.

SUMMARY OF EMBODIMENTS OF THE INVENTION

Briefly, in accordance with the invention, we provide an integrated mast mounting system for vehicles and shelters which utilizes at least two clamp bracket assemblies. The clamp bracket assemblies are mounted to the vehicle or shelter such that, during transit and storage, the mast is carried in a shallow nose down attitude. Each clamp bracket assembly includes a clamp, which wraps around the mast. The upper parts of the inside surface of the clamps are lined with a compliant high friction material, the lower parts are lined with a compliant very low friction material. The mast rests on the low friction surface of the two clamps such that when the clamps are opened, it may easily be slid backwards or forwards. When one or both clamps are closed and tightened, longitudinal movement of the mast relative to the closed clamp(s) is prevented. One of the clamp bracket assemblies is pivoted to permit the mast to be tilted up or down. One of the clamps may be attached to a trolley assembly, which in turn is installed on a rail along the top of the vehicle or shelter.

An important aspect of the invention is the concept that the mast is moved forwards or backwards, depending on the embodiment, until its point of balance (with payload) is adjacent to the pivoting clamp. The foot of the mast may then be lowered by hand to the ground.

A block and tackle, come along, or winch, may then be used to provide mechanical advantage to complete the raising of the mast to the vertical, and later, during the take down process, to lower the mast back into the clamp.

During the raising and lowering operations, guy ropes are utilized to stabilize the mast. A horseshoe shaped guide is attached to one or both clamps to facilitate correct alignment of the mast with the clamp when the mast is being lowered onto the clamp. According to a preferred embodiment, the system is mounted on the side of a vehicle or shelter. In another preferred embodiment, the system is mounted on the top of a vehicle or shelter.

DETAILED DESCRIPTION

The drawings are provided to further illustrate to those skilled in the art how to make and use the invention and are not intended as a limitation on the scope of the invention. In the drawings, like reference characters identify the same elements in the several views.

Referring to FIG. 1, a mast assembly generally indicated by reference numeral 1, is shown mounted onto a shelter 2, which is in turn mounted onto a HMMWV 3. The system is shown in the Transport Configuration. The mast 1 is supported by a cantilevered forward clamp bracket assembly generally designated 4 and by a rear clamp bracket assembly generally designated 5 such that the front end of the mast 1 is just short of the front of the HMMWV 3. In addition, the mast is supported in a nose down attitude of approximately 4 degrees to the horizontal. The position of the cantilevered forward clamp bracket assembly 4 is such that the forward end of the mast is easily reached, even by a short person, yet obscuration of the driver's view from the cab is minimized. The center of gravity 6 is approximately equidistant to the two bracket assemblies 4 and 5. A winch 7 is shown attached to the rear of the shelter. The winch cable 8 is shown routed over a pulley 9 and connected to the extreme rear end of the mast 1.

Figure 2:
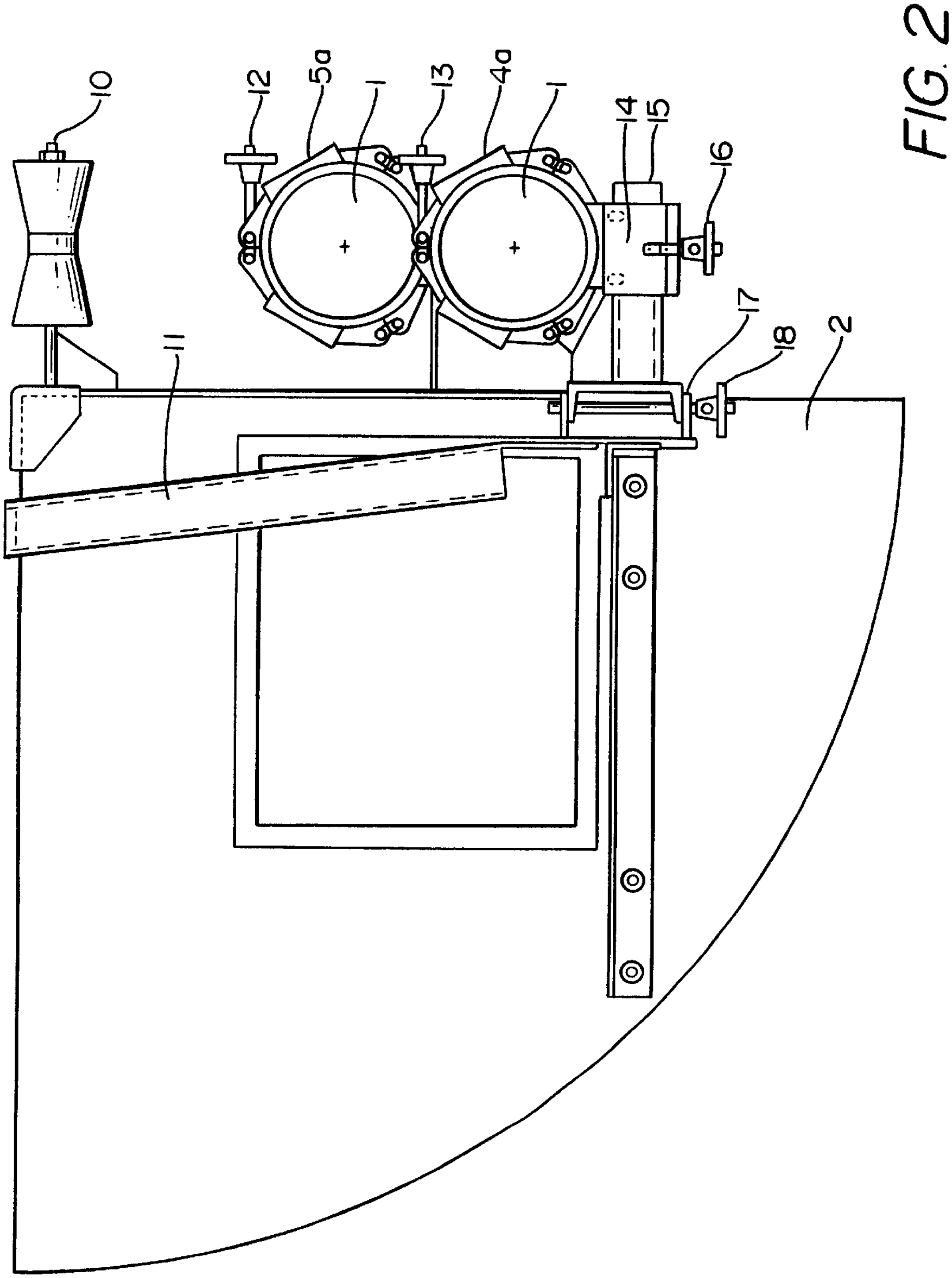
FIG. 2 is a general view of a side mounted system, looking aft from in front.

Referring to FIG. 2, which shows a general view of a side mounted system, looking aft from in front of the vehicle, the mast 1 is not shown for clarity. The forward bracket assembly includes a clamp 4*a* mounted onto a pivot block 14, which is assembled onto an elevation shaft 15. Pivot block 14 may be adjusted about the longitudinal axis of shaft 15. In turn, the elevation shaft 15 is hinged to the pivot clevis 17 which is pivotable about a vertical axis. Thus the front clamp 4*a* is mounted for rotation about horizontal and vertical axes in the nature of a universal joint. Rotation of the forward clamp about the lateral and vertical axes may be prevented by tightening the appropriate hand knobs, 16 and 18. The pivot clevis 17 is secured to the shelter 2 by a system of cantilevered support struts and braces, one of which, the diagonal brace, is identified 11. Hand knobs 12 and 13 are used to tighten the rear and front clamps 5*a* and 4*a*. During operation of tilting the mast upright, a hauling cable is passed over the roller of the roller assembly 10, which is located as high as possible on the rear side wall of the shelter.

In the preferred embodiment shown in FIGS. 12 and 13 each clamp includes a number of hinged petals that close around the mast (not shown for clarity). The upper petal(s), 25, is joined to the lower petal(s) 27, by hinge pins, 26, which enable the clamp to be fully opened (as shown in FIG. 13) to facilitate loading or unloading of the mast. The clamp is secured to the downwardly sloping top wall of bracket, 28, in such a way that when the mast is secured within the clamp, it rests at an angle of approximately four degrees (4°) to the horizontal. A star handle, 24, is used to close and tighten the clamp.

In FIG. 2, the clamps are shown in the closed condition. A star handle, 24, is used to tighten the clamp against the mast. The inner surfaces 29 of the upper clamp petal(s), 25, are lined with a high friction material such as rubber or urethane, preventing movement of the mast within the tightened clamp. The inner surfaces 30, of the lower petal(s), 27, are lined with a low friction material such as Teflon or Nylon. When the clamp is open, the upper petal(s) do not touch the mast, which rests on the low friction surface 30 of the lower petal(s). The mast may now be easily slid relative to the clamp.

Any other suitable clamp capable of opening and closing to receive and secure the mast, may be employed instead of the specific clamp shown and described herein.

In FIG. 3, the mast 1, is shown being pulled forward. Having determined the location of the center of gravity 6 of the combined mast and payload, the forward and rear clamps 4*a* and 5*a* are opened. The mast 1 is then slid forwards until the center of gravity 6 of the mast with payload 19 is just to the rear of the forward clamp 4*a*. This operation may be carried out manually, or with the mechanical advantage provided by a block and tackle or winch 7, as shown. Once the mast 1 has reached a position where its point of balance 6 is just to the rear of the forward clamp 4*a*, the forward clamp 4*a* is closed and secured. The payload, hauling rope, and other equipment required to be attached to the top of the mast are now connected.

In FIG. 4, the mast foot 20 is lowered to the ground, pivoting around the elevation shaft 15. Once the mast foot 20 reaches ground level, it is secured by a base plate (not shown). The figure shows the winch 7 being used for this operation, with the hauling cable being passed over the roller of the roller assembly 10. As a more convenient alternative, because the center of gravity of the mast with its payload is close to the forward clamp 4*a*, lowering may be carried out by hand. With the side mounting embodiment of the invention under discussion, lateral movement of the foot of the mast towards or away from the side of the vehicle is made possible by means of the pivot clevis 17. This capability caters for the case where the vehicle is parked sideways to sloping ground.

In FIG. 5, the hauling cable is used in conjunction with the winch 7 to haul the mast 1 upright. A block and tackle or come along may also be employed. In any event, the hauling cable is passed over the roller 10 at the rear of the shelter 2 to obtain the best possible lifting angle. Lateral stability during the tilting upright operation is provided by side guy ropes, not shown for clarity.

FIG. 6 shows the situation once the mast 1 is upright. Adjustment of the lower guy ropes (not shown) is used to plumb the mast vertical. Once the hauling cable has been disconnected, the vehicle may be driven away.

FIGS. 7 and 8 depict the second preferred embodiment of the invention, in which the mounting system is utilized to mount a mast on the centerline on top of a vehicle.

Figure 7A:
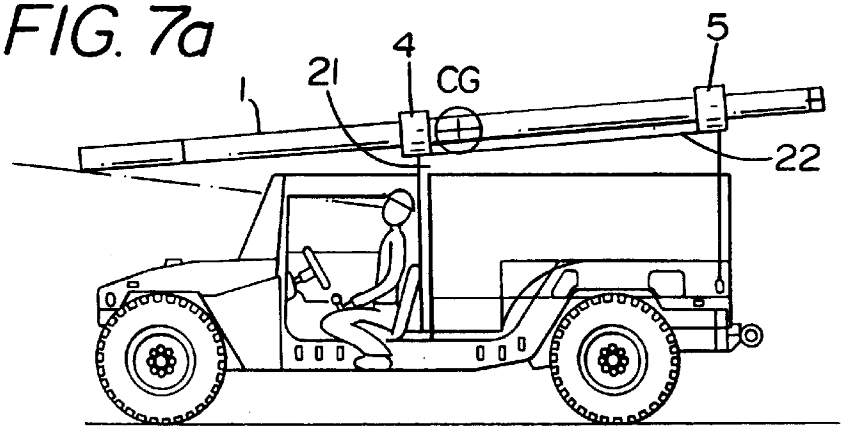

In FIG. 7*a*, the mast 1 is shown in the transit condition, supported by a forward clamp 4 just in front of its center of gravity, and a rear clamp 5 above the rear of the vehicle. As before, the mast is mounted with a nose down attitude. The front clamp is mounted on a trolley 21, the wheels of which engage a rail 22 running between the clamp supports and parallel to the longitudinal axis of the mast. The trolley may be locked in place on the rail at either end of its travel. The rear clamp is mounted on a lockable pivot, enabling the clamp to be rotated about its lateral axis. The rear clamp arrangements also provide a small degree of freedom about the vertical axis.

Figure 7B:
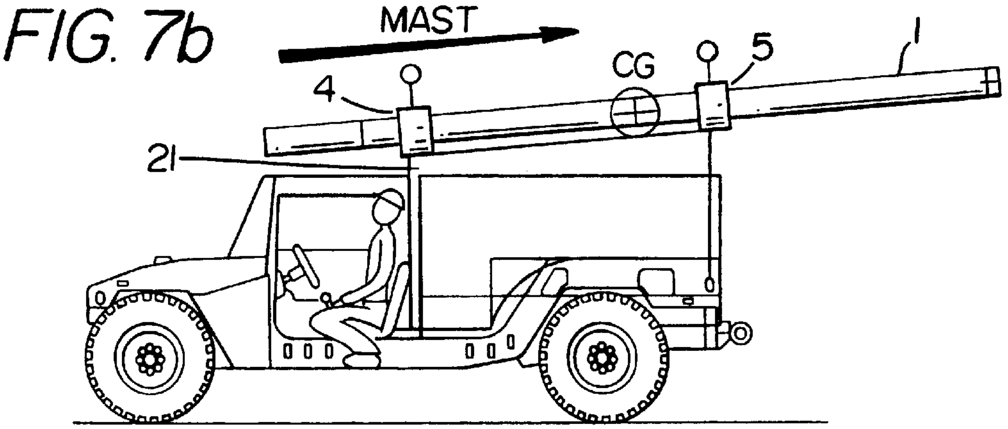

In FIG. 7*b*, having previously determined and marked the location of the center of gravity of the combined mast and payload, and with the trolley 21 locked in place at the forward end of its travel, the two clamps 4*a* and 5*a* are opened. The mast 1 is slid back until the marked combined center of gravity location point is just to the rear of the front clamp 4*a*. The front clamp 4*a* is now closed and tightened, and the trolley lock is disengaged.

Figure 7C:
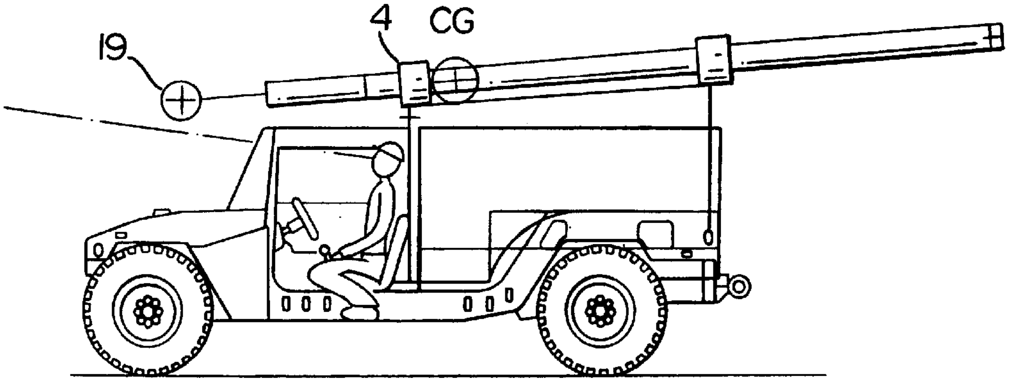

In FIG. 7*c*, the antenna payload 19, hauling cable, and other equipment required to be attached to the top of the mast are now connected. The actual center of gravity therefore shifts forwards to the previously determined location, just to the rear of the forward clamp 4*a*.

Figure 8A:
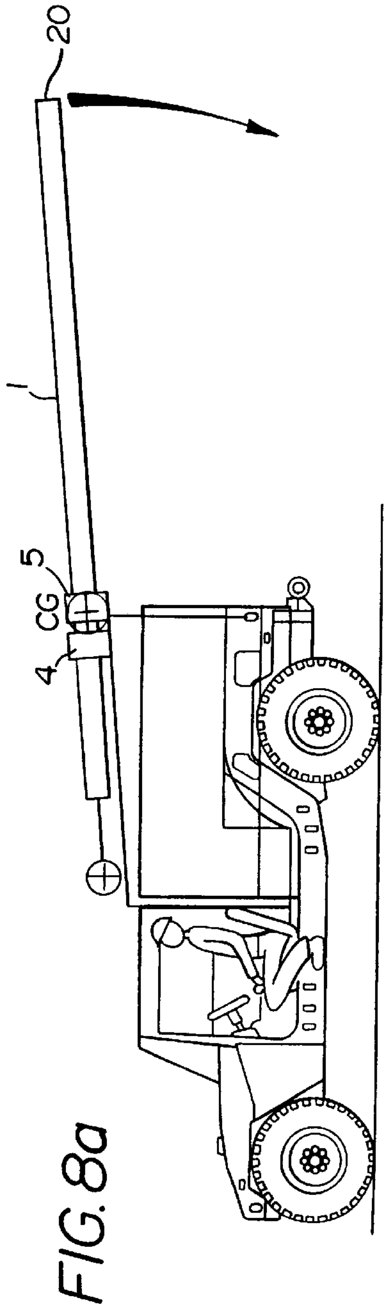

In FIG. 8*a*, the forward clamp 4*a* , with mast 1 and other equipment attached, is hauled to the rear until it is adjacent to the rear clamp 5. The rear clamp 5*a* is then closed around the mast 1 and tightened. At this stage, the center of gravity of the combined mast and payload is close to the rear clamp 5*a*. Once the forward clamp 4 has been opened and the rear clamp pivot lock disengaged, the mast foot 20 may be lowered in the same way in the previously described embodiment of the invention.

Figure 8B:
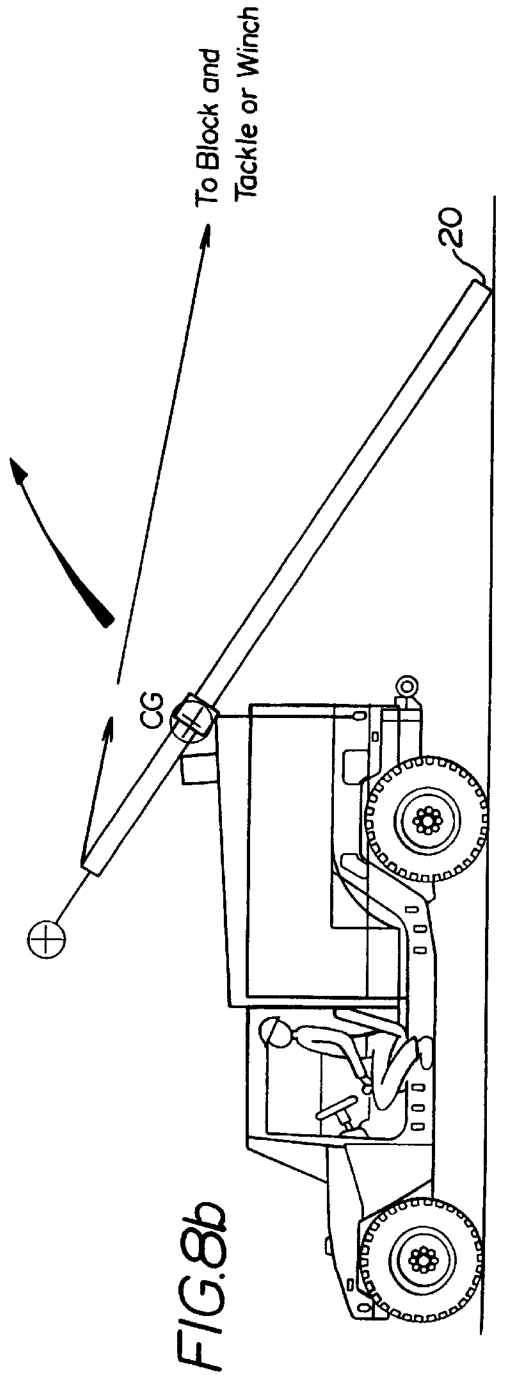

In FIG. 8*b*, the mast foot 20 is shown resting on the ground, with the mast at an angle to the horizontal. A block and tackle, or winch, is used to haul the mast upright. As in the previously discussed embodiment, side guy ropes (not shown for clarity) are used to provide lateral stability. Because the pivot point is higher in this embodiment than in the first preferred embodiment, (due to the inclined attitude of the mast in the transit condition), the angle between the mast and the ground is larger and more advantageous. Once the mast is upright, the vehicle may be driven away.

Referring to FIG. 9, it can be seen that the tilt down attitude of the mast has two beneficial effects in relation to air transportation on the C-130 airplane. Firstly, the mast on the vehicle boarding the plane 21 is well clear of the cargo bay ceiling, so there is no problem getting on board with this configuration. Secondly, the front and rear ends of the mast 22 are at different heights, permitting the mast on adjacent vehicles to overlap, thus permitting close loading of vehicles one behind the other.

A variation of the second embodiment in which the foot of the mast is transported at the front of the vehicle, and the mast is slid forwards instead of backwards prior to tilting upright, also falls within the scope of this invention.

Referring to FIGS. 10 and 11, the guide bracket 23 is bolted to the rear face of the pivot block to which the clamp is mounted. As the mast descends towards the clamp during the tear down process, any small misalignment of the mast with the bracket will cause the mast to catch one of the tilted out ends of the bracket. Thereafter, inertia of the heavy mast automatically aligns the clamp, which is pivoted on two axes, as the mast settles into it. The same principle, and the same guide bracket, is used to assist alignment of the rear clamp in the second embodiment of the design.

It will be seen that the present invention may be used on any mast which is too long to be mounted vertically, including telescopic masts. In addition it will be seen that the present invention incorporates the following principles and advantages:

a) the principle that the mast is mounted with a slight nose down attitude, such that the forward end of the mast is readily accessible for attachment of payload and other equipment by personnel on the ground.

b) the principle that the mast is mounted with a slight nose down attitude, so that, when mounted on the HMMWV (whether directly, or via a shelter attached to the HMMWV) there is ample clearance between the mast and the cargo compartment ceiling as the vehicle drives up the loading ramp.

c) the principle that the mast is mounted with a slight nose down attitude, so that there is sufficient height difference between the front end and rear end of a vehicle or shelter mounted mast to permit two adjacent masts to overlap without interference when vehicles are loaded nose to tail for air, or surface transportation.

d) the principle that the mast is secured to the vehicle or shelter by means of two primary clamps, designed to permit the mast to be slid easily forwards or backwards when the clamps are opened.

e) the principle that the clamps are lined with two different types of compliant material. The upper parts of the clamps are lined with high friction material to provide a firm grip on the mast when the clamp is closed and tightened. The lower part of the clamp is lined with a low friction material, permitting the mast to slide easily when the clamp is opened.

f) the principle that one of these clamps may be mounted to a trolley, which may be caused to run along a rail affixed between the support points, such that one clamp may be brought immediately adjacent to the other clamp.

g) the principle that one of these clamps is so mounted that it permits the mast to be tilted about its lateral axis. This same clamp also has a limited freedom of rotation about its vertical axis.

h) the principle that, during the mast deployment sequence, the mast is moved forwards or backwards (depending on the embodiment) relative to the clamps in such a way as to relocate the center of gravity of the mast with its payload and attachments to a position coincident with, or immediately adjacent to, the pivoting clamp.

i) the principle that combined mast and payload weights up to the maximum practical for transportable operations may be accommodated and handled by a crew of one or two persons using this invention since loads are balanced.

j) the principle that slope in any direction relative to the vehicle is accommodated for by the universal joint arrangement of the pivot clamp assembly, together with the latter stages of mast tilting, in which the mast is plumbed in one axis by the hauling cable and in the other, by the side guy ropes.

k) the principle that the guy ropes, which are attached to the tip end of the mast, are used to provide lateral stability as the mast is hauled to the vertical providing a safe and straight forward means to cope with the very large moments inherent in long heavily loaded equipment.

l) the principle that the mast is easily returned to the installed condition on the vehicle because the guide arms and two axes of freedom of the pivot clamp on the which the mast is lowered during the take down procedure accommodate for any minor misalignment of the vehicle relative to the mast.

Although several preferred embodiments of the invention have been shown and described, it will be readily apparent to those skilled in the art that the present invention is not limited to these specific embodiments but rather is set forth in the appended claims.

We claim:

1. A bracket assembly for mounting an elongated object comprising in combination: a clamp assembly including upper and lower clamp members for receiving the object therebetween, the lower clamp member having a low friction surface for facilitating movement of the object along the surface of the lower clamp, and the upper clamp member having a high friction surface for engaging the object to prevent movement of the object relative to the clamp members when the object is gripped by and between the clamp members, a shaft, said clamp assembly being mounted on and pivotable about the shaft, and means for fixing the clamp assembly to the shaft in adjusted position.

2. The bracket assembly defined in claim 1 including means mounting the shaft for adjustable movement about a generally vertical axis.

3. The bracket assembly defined in claim 1 including a guide bracket for guiding the object into the clamp assembly.

4. The bracket assembly defined in claim 3 wherein said guide bracket has a generally U shaped configuration.

5. The bracket assembly defined in claim 2 including a guide bracket for guiding the object into the clamp assembly.

6. In combination with a structure including a wall, a system for mounting an elongated object to the wall, the system including in combination at least two bracket assemblies mounted to the wall at spaced locations for receiving the object, one of said bracket assemblies being movable for adjustment about a generally vertical axis as well as a generally horizontal axis.

7. The combination defined in claim 6 wherein said portable structure is an automotive vehicle having forward and rearward ends and said bracket assemblies are respectively located at said forward and rearward ends, and said bracket assembly at the forward end is mounted to the wall at an elevation below that of the other bracket assembly such that the object extends downwardly at an incline towards the forward end when mounted on the bracket assemblies.

8. The combination defined in claim 7 wherein the bracket assemblies are mounted to the wall such that the object extends at an angle of about 4° (degrees) to the horizontal when mounted on the bracket assemblies.

9. The combination defined in claim 6 wherein each bracket assembly includes a clamp assembly including upper and lower clamp members engageable with opposite portions of the object, the lower clamp member having a low friction surface for facilitating movement of the object along the surface during loading and unloading.

10. The combination defined in claim 9 wherein the upper clamp member has a relatively high friction surface for engaging the object and preventing movement of the object relative to the clamp members when engaged by the clamp members.

11. The combination defined in claim 6 wherein one of said bracket assemblies is mounted for movement along a rail fixed to the wall to enable said one bracket assembly to be moved towards or away from said other bracket assembly.

12. The combination defined in claim 6 wherein said portable structure is a vehicle and said wall is one of a top wall and side wall of the vehicle.

13. The combination defined in claim 6 further including a guide mounted to said wall above the level of the bracket assemblies for receiving and guiding a line attached to the object for unloading the object from the bracket assemblies.

14. In combination with a structure a system for mounting an elongated object, the system including in combination two bracket assemblies mounted at spaced locations on said structure for receiving the object, a rail fixed to said structure and extending between said bracket assemblies, one of said bracket assemblies being pivotable about a generally horizontal axis, and the other bracket assembly being movable along said rail towards and away from said one bracket assembly.

15. A method of unloading an elongated object from a structure wherein the object is supported on brackets mounted on the structure at spaced locations including the steps of: moving the object along the brackets until the center of gravity of the object is located adjacent one of the brackets, freeing the object from the other bracket, and pivoting the object about a generally horizontal axis located at said one bracket until one end of the object engages the ground.

16. The method defined in claim 15 including the step of mounting said one bracket to said structure to be movable about a generally horizontal axis to enable the object to be pivoted during unloading.

17. The method defined in claim 15 including the steps of moving the other bracket to a position towards or adjacent to said one bracket prior to pivoting the object.

18. The method defined in claim 15 including the steps of mounting the brackets on the structure at different levels so that the object extends at an incline while held by said brackets.

19. The method defined in claim 18 wherein said structure is a vehicle and the method further includes the steps of mounting the brackets on the vehicle such that the object extends downwardly in a forward direction of the vehicle.

20. The method defined in claim 19 further including the step of locating the object on the brackets so that the front end of the object is located to the rear of the forward end of the vehicle.

21. The method defined in claim 15 including the step of using a line attached to the other end of the object for pivoting the object about said axis towards a vertical position.

22. The method defined in claim 21 including the steps of laterally stabilizing the object during pivoting by lines attached to said other end of the object and extending on opposite sides of the object.

23. The method defined in claim 21 including the step of using a line attached to said one end of the object for pivoting the object.

24. The method defined in claim 15 including the step of using a clamp assembly for said one bracket and clamping the object with said clamp assembly prior to pivoting the object.

25. A method of mounting and dismounting an elongated object from a vehicle comprising the steps of mounting the object on at least two brackets mounted to the vehicle at spaced locations, one of the brackets having a generally horizontal axis of movement and being pivotable about said generally horizontal axis for adjustment, moving the object while on the brackets until the center of gravity of the object lies generally at one of the brackets, fixing the object to said one bracket and then pivoting said bracket about said generally horizontal axis until the lower end of the object engages the ground.

26. The method defined in claim 25 further including the step of attaching a line to the upper end portion of the object and pulling the line until the object reaches a vertical position.

27. The method defined in claim 25 including the steps of mounting the other bracket on a rail fixed to the vehicle to extend to said one bracket, and moving said other bracket with the object along the rail towards said one bracket prior to pivoting the object about said axis.

* * * * *